United States Patent
Shim et al.

(10) Patent No.: US 8,770,124 B2
(45) Date of Patent: Jul. 8, 2014

(54) DEVICE FOR DIMINISHING FLOW RESISTANCE IN MOON POOL

(75) Inventors: In-Hwan Shim, Seoul (KR); Young-Bok Choi, Gunpo-si (KR)

(73) Assignee: Daewoo Shipbuilding & Marine Engineering Co., Ltd., Seoul (KR)

( * ) Notice: Subject to any disclaimer, the term of this patent is extended or adjusted under 35 U.S.C. 154(b) by 136 days.

(21) Appl. No.: 12/995,112

(22) PCT Filed: Aug. 5, 2010

(86) PCT No.: PCT/KR2010/005134
§ 371 (c)(1), (2), (4) Date: May 6, 2013

(87) PCT Pub. No.: WO2011/099682
PCT Pub. Date: Aug. 18, 2011

(65) Prior Publication Data
US 2013/0255561 A1    Oct. 3, 2013

(30) Foreign Application Priority Data
Feb. 12, 2010    (KR) .................. 10-2010-0013134

(51) Int. Cl.
*B63B 5/14*    (2006.01)

(52) U.S. Cl.
USPC ........................................ 114/65 R

(58) Field of Classification Search
USPC .................. 114/65 R, 121, 264; 405/195.1
See application file for complete search history.

(56) References Cited

U.S. PATENT DOCUMENTS

| | | | |
|---|---|---|---|
| 3,395,806 A * | 8/1968 | Payne | 210/345 |
| 6,503,022 B1 * | 1/2003 | Nuss | 405/195.1 |
| 6,543,376 B1 * | 4/2003 | Breivik et al. | 114/230.12 |
| 7,918,174 B2 * | 4/2011 | Ahn et al. | 114/65 R |
| 2009/0151613 A1 * | 6/2009 | Ahn et al. | 114/56.1 |
| 2009/0205554 A1 * | 8/2009 | Srinivasan | 114/264 |

* cited by examiner

*Primary Examiner* — Stephen Avila
(74) *Attorney, Agent, or Firm* — Steven M. Greenberg, Esq.; CRGO Law

(57) ABSTRACT

A device for diminishing flow resistance in a moon pool is disclosed. The device includes a guide structure (16) having a lattice shape. The guide structure includes horizontal guide plates (20), guide ramps (22), longitudinal reinforcing beams (24) and a hinge axis (H). The horizontal guide plates are spaced apart from each other along a longitudinal direction of a hull and arranged in rows along a lateral direction of the hull. The guide ramps are arranged in rows along the lateral direction and coupled to the respective horizontal guide plates. Front ends of the guide ramps are inclined upwards towards a bow side of the hull and spaced apart from rear ends of the adjacent fore horizontal guide plates. The longitudinal reinforcing beams support the horizontal guide plates and the guide ramps. The lattice guide structure is rotated around the hinge axis towards a transit position or a working position.

10 Claims, 4 Drawing Sheets

DEVICE FOR DIMINISHING FLOW RESISTANCE IN MOON POOL

TECHNICAL FIELD

The present invention relates, in general, to moon pools provided in ships or marine structures and, more particularly, to a device for diminishing flow resistance in a moon pool, the device being configured such that when investigation and drilling work is conducted, the device is retracted in such a way as to rotate towards an inner sidewall of the moon pool so as to facilitate the work, and when the ship provided with the moon pool runs, the device is extended towards the bottom surface of the ship to block separated flow from entering the moon pool, thus effectively reducing flow resistance.

BACKGROUND ART

As is well known to those skilled in the art, as industrialization has advanced in certain areas, the usage of various resources has rapidly increased. In particular, the production and supply of resources such as oil has arisen as a very important issue. For this reason, drill ships equipped with drilling equipment and FPSO (Floating, Production, Storage and Offloading) units which are floating vessels used by the offshore industry were recently developed and have been used in investigation and drilling work to produce various resources from the deep sea.

In vessels such as drill ships or the like, a moon pool, which is a comparatively large opening, is formed through a central portion of a hull so that drilling pipes or mining pipes are moved to the bottom of the sea through the moon pool. The moon pool is indispensable for such functions as drilling for example, but becomes a weak point in terms of the anchoring of the ship, the voyage stability and the ship's propulsion performance.

In particular, in a conventional drill ship, due to a sloshing phenomenon which is induced by relative movement between seawater in the moon pool and seawater outside the ship, when the drill ship runs, resistance to the ship is increased so that the velocity thereof is reduced. In addition, power consumption increases, resulting in increased fuel consumption. Furthermore, if the ship runs on art area of pack ice, the pack ice may enter the hull of the ship through the moon pool, thus causing the problem of damage to the hull.

In an effort to overcome these problems, such as an increase of resistance attributable to the motion of seawater in the moon pool, a technique was proposed in which a door structure or flap structure is used to completely close the moon pool when necessary. However, in the terms of the structure for completely closing the moon pool, the weight of the ship is excessively increased. Therefore, there are many difficulties in operating equipment such as tugboats for tugging the heavy ship.

DISCLOSURE

Technical Problem

Accordingly, the present invention has been made keeping in mind the above problems occurring in the prior art, and an object of the present invention is to provide a device having a lattice structure which occupies a portion of a bottom area of a moon pool and has a wave breaking function which blocks separated flow from entering the moon pool when the ship runs, thus reducing resistance to the hull of the ship, and which is light to facilitate the use of the ship or marine structure equipped with the moon pool or the handling of the ship or marine structure, for example, using various pulling equipment, and in which when investigation and drilling work is conducted through the moon pool, the lattice structure is retracted in such a way as to rotate towards an inner sidewall of the moon pool, thus facilitating the work.

Technical Solution

In order to accomplish the above object, the present invention provides a device for diminishing flow resistance in a moon pool, the device including a guide structure having a lattice shape. The guide structure includes: a plurality of horizontal guide plates spaced apart from each other along a longitudinal direction of a hull, the horizontal guide plates being arranged in a plurality of rows along a lateral direction of the hull; a plurality of guide ramps arranged in a plurality of rows along the lateral direction of the hull, the guide ramps being coupled at rear ends thereof to front ends of the respective horizontal guide plates, wherein front ends of the guide ramps are inclined upwards towards a bow side of the hull and spaced apart from rear ends of the adjacent fore horizontal guide plates; a plurality of longitudinal reinforcing beams arranged in a plurality of rows along the longitudinal direction of the hull, the longitudinal reinforcing beams being coupled to the corresponding horizontal guide plates and the corresponding guide ramps; and a hinge axis around which the lattice guide structure is rotated in the moon pool towards a transit position or a working position.

The device may further include a frame provided in the moon pool so as to be rotatable around the hinge axis. The frame may receive and support therein the horizontal guide plates, the guide ramps and the longitudinal reinforcing beams such that the horizontal guide plates, the guide ramps and the longitudinal reinforcing beams are coupled to each other to have a lattice structure.

The hinge axis may be oriented in the lateral direction of the hull in the moon pool, whereby the guide structure is rotated around the hinge axis with respect to a bow-side inner sidewall or a stern-side inner sidewall so that the lattice guide structure is extended to the transit position or retracted to the working position. In this case, the hinge axis may comprise two hinge axes which are respectively disposed adjacent to the bow-side inner sidewall and the stern-side inner sidewall of the moon pool. The lattice guide structure may be divided into two parts based on an intermediate portion of the moon pool with respect to the longitudinal direction of the hull.

Alternatively, the hinge axis may be oriented in the longitudinal direction of the hull in the moon pool, whereby the guide structure is rotated around the hinge axis with respect to a port-side inner sidewall or a starboard-side inner sidewall so that the lattice guide structure is extended to the transit position or retracted to the working position. In this case, the hinge axis may comprises two hinge axes which are respectively disposed adjacent to the port-side inner sidewall and the starboard-side inner sidewall of the moon pool, and the lattice guide structure is divided into two parts based on an intermediate portion of the moon pool with respect to the lateral direction of the hull.

The device may further include an operating unit rotating the lattice guide structure around the hinge axis in the moon pool to the transit position or the working position, and a locking unit retaining the lattice guide structure at the working position in the moon pool.

Advantageous Effects

A device for diminishing flow resistance in a moon pool according to the present invention has a light lattice structure which selectively and partially closes the bottom area of the opening of the moon pool. Thus, when the ship equipped with the device runs, the device conducts a wave breaking function which blocks separated flow from entering the moon pool, thus effectively reducing flow resistance to the ship. Furthermore, because the device is light, the use of the ship or marine structure equipped with the moon pool or the handling of the ship or marine structure, for example, using various pulling equipment, can be facilitated. In particular, the device of the present invention can not only prevent separated flow from entering the moon pool when the ship runs on the general areas of the sea but also prevent pack ice flowing along the bottom surface of the ship from entering the moon pool when the ship runs on a pack ice area, such as the polar region.

Moreover, the lattice structure can be retracted in such a way as to rotate towards an inner sidewall of the moon pool. Thus, when investigation and drilling work is conducted through the moon pool, the moon pool can be open. Therefore, when equipment, such as pipes, is moved to the bottom of the sea through the moon pool, collision of the equipment to the hull of the ship can be more reliably avoided.

BEST MODE

Figure 1:
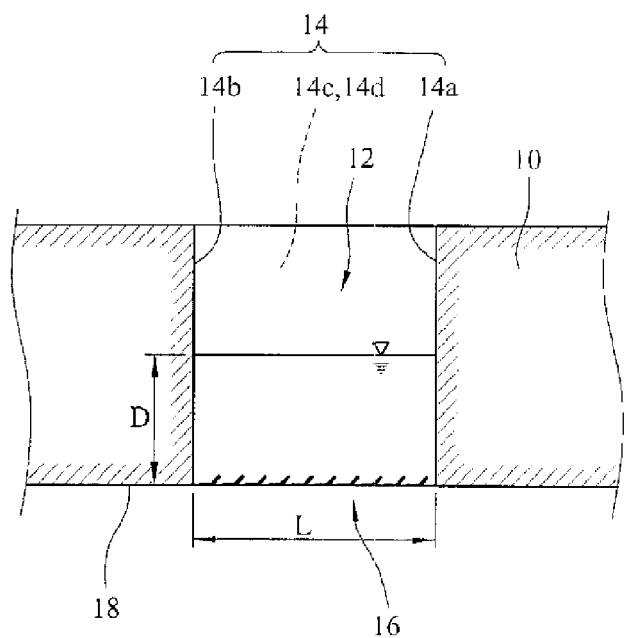
FIG. 1 is a side sectional view showing the installation of a device for diminishing flow resistance in a moon pool, according to the present invention.

Hereinafter, an embodiment of the present invention will be described in detail with reference to the attached drawings.

As shown in the drawings, a moon pool 12 for a ship or a marine structure has a hollow shape which is vertically formed through a hull 10. The moon pool 12 directly communicates a deck with the sea level. In detail, the moon pool 12 includes therein a plurality of inner sidewalls 14 which face each other. The horizontal cross-section of the moon pool 12 may have a rectangular shape. Alternatively, the horizontal cross-section of the moon pool 12a may have a quadrangular shape which has different widths between the bow side and the stern side. In this case, the width of the bow side of the moon pool 12 is typically less than that of the stern side.

A lattice guide structure (moon pool guide array) 16 having a planar shape is rotatably installed in the moon pool 12. When the ship or the marine structure runs on the sea, the lattice guide structure 16 is maintained in a state of having been extended in the horizontal direction towards a bottom surface 16 in the moon pool 12 to block seawater from being drawn into the moon pool 12, thus reducing fluid resistance applied to the hull. When it is in investigation and drilling work, the lattice guide structure 16 is retracted towards the inner sidewalls 14 and then maintained in the retracted state to allow various kinds of equipment to pass through the opening of the moon pool 12 to conduct the work.

To achieve the above-mentioned purpose, the lattice guide structure 16 includes a plurality of horizontal guide plates 20, a plurality of guide ramps 22, a plurality of longitudinal reinforcing beams 24 and a hinge axis H. The horizontal guide plates 20 are arranged in the moon pool 12 in a plurality of rows along the lateral direction of the hull and are spaced apart from each other at regular intervals along the longitudinal direction of the hull. The guide ramps 22 are arranged in the moon pool 12 in a plurality of rows along the lateral direction of the hull. Rear ends of the guide ramps 22 are coupled to front ends of the respective horizontal guide plates 20, and front ends of the guide ramps 22 are inclined upwards towards the bow side of the hull. In other words, the front ends of the guide ramps 22 are inclined towards the deck disposed at a position corresponding to the upper end of the moon pool 12. In addition, the front end of each guide ramp 22 is spaced apart from a rear end of the adjacent other horizontal guide plate 20 by a predetermined distance. The longitudinal reinforcing beams 24 are arranged in the moon pool 12 in a plurality of rows along the longitudinal direction of the hull and coupled to the corresponding horizontal guide plates 20 and the corresponding guide ramps 22. The longitudinal reinforcing beams 24 reinforce the structural strength of the horizontal guide plates 20 and the guide ramps 22. The lattice guide structure 16 is rotatable in the moon pool 12 around the hinge axis H towards a transit position (a position of the lattice guide structure 16 when it is extended towards the bottom surface 18) or towards a working position (a position of the lattice guide structure 16 when it is retracted towards the inner sidewalls). The lattice guide structure 16 including the horizontal guide plates 20, the guide ramps 22 and the longitudinal reinforcing beams 24 is configured such that the entire appearance of the lattice guide structure 16 corresponds to the horizontal cross section of a space defined by the inner sidewalls 14 of the moon pool 12.

Figure 3:
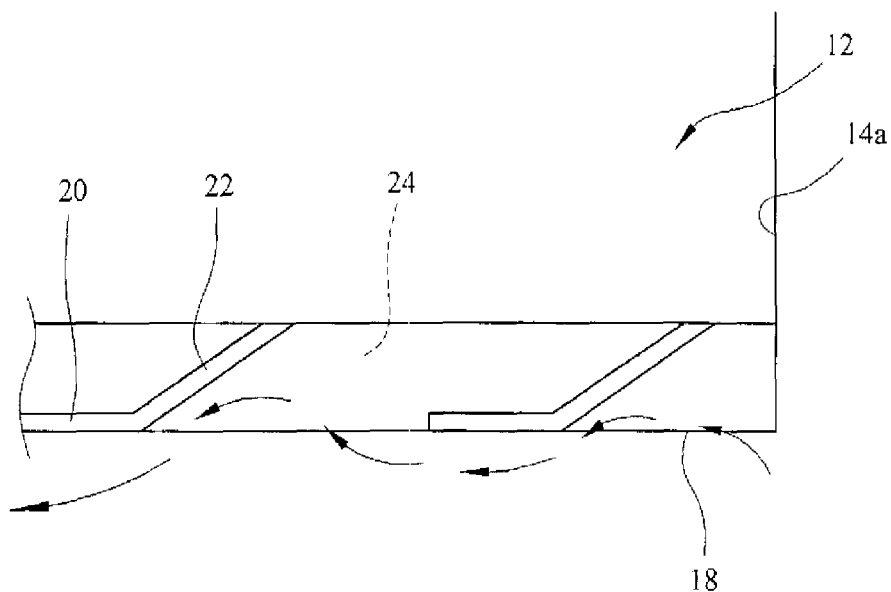
FIG. 3 is a view illustrating a wave breaking function of the lattice guide structure of FIG. 2 when a ship runs.

As shown in FIG. 3, the guide ramps 22 block water flow separated from the seawater which flows from the bow side towards the stern side when the hull runs, thus preventing the separated flow from entering the moon pool 12, and guiding the separated flow in the original flow direction (the direction in which the seawater flows along the bottom surface 18 of the hull). Here, although a distance between the front end of each guide ramp 22 and the rear end of the adjacent fore horizontal guide plate 20 is relatively short, the guide ramp 22 can smoothly guide the separated flow in the original flow direction before the magnitude of the separated flow increases again. Therefore, even though the guide ramp 22 is set such that the length thereof is relatively short, the separated flow can be effectively prevented from entering the moon pool 12. Thus, the entire area of the horizontal guide plates 20 in the moon pool 12 can be less than about 30% of the entire horizontal area of the moon pool 12.

Each horizontal guide plate 20 is coupled to the rear end of the corresponding guide ramp 22 and functions to guide water flow that has been changed in direction by the guide ramp 22 and maintain the water flow such that they flow in the original flow direction (the direction in which the seawater flows along the bottom surface 18 of the hull). Thereby, water flow which is separated from the seawater at the rear end of the guide ramp 22 can be more reliably prevented from entering the moon pool 12 again. Particularly, the horizontal guide plate 20 serves to delay, by the length of the horizontal guide plate 20, separation of water flow induced at the rear end of the guide ramp 22 which is the junction between the horizontal guide plate 20 and the guide ramp 22. Here, it is unnecessary to greatly increase the length of each horizontal guide plate 20, because the adjacent following guide ramp 22 is disposed at a position spaced apart from the rear end of the horizontal guide plate 20 by a predetermined distance so that water flow can be prevented from entering the moon pool 12 from the rear end of the horizontal guide plate 20.

The longitudinal reinforcing beams 24 are provided in the moon pool 12 and oriented in the longitudinal direction of the hull. Furthermore, the longitudinal reinforcing beams 24 are coupled to the horizontal guide plates 20 and the guide ramps 22 to enhance the strength of the horizontal guide plates 20 and the guide ramps 22 against resistance applied to thereto by the flow of fluid. Therefore, the function of the horizontal guide plates 20 and the guide ramps 22 which restricts water flow from entering the moon pool 12 can be more reliably ensured by the longitudinal reinforcing beams 24.

The lattice guide structure 16 further includes a frame 26 which is disposed adjacent to the perimeter in the moon pool 12 and is rotatable around the hinge axis H. The frame 26 in the moon pool 12 receives and supports therein the horizontal guide plates 20, the guide ramps 22 and the longitudinal reinforcing beams 24 such that they are coupled to each other to have a lattice structure. The frame 26 has a shape corresponding to the horizontal cross section of the space defined by the inner sidewalls 14 of the moon pool 12. That is, one end of the frame 26 and the corresponding ends of the longitudinal reinforcing beams 24 form the hinge axis H around which the lattice guide structure 16 can rotate in the moon pool 12.

In the present invention, the hinge axis H around which the lattice guide structure 16 rotates to the transit position or the working position may be formed in any one of the bow, stern, port and starboard inner sidewalls 14. Alternatively, the hinge axis H may be formed in at least two portions of the inner sidewalls 14 of the moon pool 12.

Figure 2:
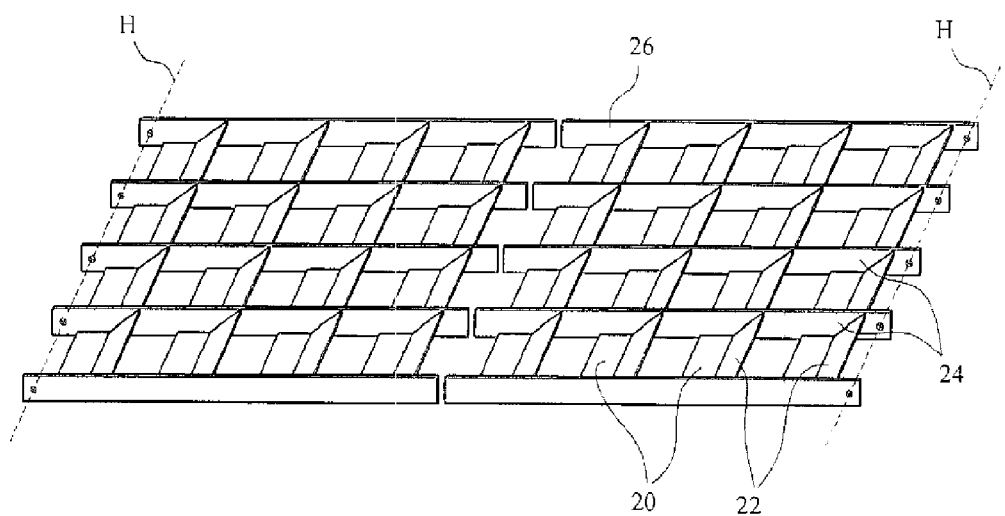
FIG. 2 is a perspective view showing an embodiment of a lattice guide structure according to the present invention.

For example, the hinge axis H may be oriented in the lateral direction of the hull in the moon pool 12. In this case, the lattice guide structure 16 is rotated around the hinge axis H with respect to the bow-side inner sidewall 14a or the stern-side inner sidewall 14b so that the lattice guide structure 16 is extended to the transit position or retracted to the working position. As shown in FIG. 2, two hinge axes H may be formed in the lateral direction of the hull. In this case, the two hinge axes H are respectively disposed adjacent to the bow-side inner sidewall 14a and the stern-side inner sidewall 14b of the moon pool 12. The lattice guide structure 16 is divided into two parts based on an intermediate portion of the moon pool 12 with respect to the longitudinal direction of the hull, and the two parts of the lattice guide structure 16 are respectively rotated relative to the bow-side inner sidewall 14a and the stern-side inner sidewall 14b so that they are extended to the transit position or retracted to the working position.

As another example, the hinge axis H may be oriented in the longitudinal direction of the hull in the moon pool 12. In this case, the lattice guide structure 16 is rotated around the hinge axis H with respect to the port-side or starboard-side inner sidewall 14c or 14d so that the lattice guide structure 16 is extended to the transit position or retracted to the working position. In addition, two hinge axes H may be formed in the longitudinal direction of the hull. In this case, the two hinge axes H are respectively disposed adjacent to the port-side inner sidewall 14c and the starboard-side inner sidewall 14d of the moon pool 12. The lattice guide structure 16 is divided into two parts based on an intermediate portion of the moon pool 12 with respect to the lateral direction of the hull, and the two parts of the lattice guide structure 16 are respectively rotated relative to the port-side inner sidewall 14c and the starboard-side inner sidewall 14d so that they are extended to the transit position or retracted to the working position.

The device of the present invention further includes an operating unit and a locking unit. The operating unit rotates the lattice guide structure 16 around the hinge axis H in the moon pool 12 to the transit position or the working position. The locking unit retains the lattice guide structure 16 to the corresponding inner sidewall 14 after the lattice guide structure 16 is moved to the working position by the operating unit.

In detail, the operating unit is not limited to a special device, so long as it can rotate the lattice guide structure 16 in such a way as to apply the operating force of, for example, a crane or a hydraulic actuator, to a free end of the lattice guide structure 16 which is opposite to its portion on which the hinge axis H is formed.

Furthermore, the locking unit is also not limited to a special structure, so long as it can retain the lattice guide structure 16 at the working position at which the free end of the lattice guide structure 16 is moved onto the corresponding inner sidewall 14 of the moon pool 12. Preferably, a fastener is installed on the corresponding inner sidewall 14 of the moon pool 12 as the locking unit for retaining the lattice guide structure 16. Hereinafter, a preferred embodiment of the specifications of the components of the lattice guide structure 16 relative to the entire area of the space defined by the inner sidewalls 14 of the moon pool 12 will be explained.

Figure 4:
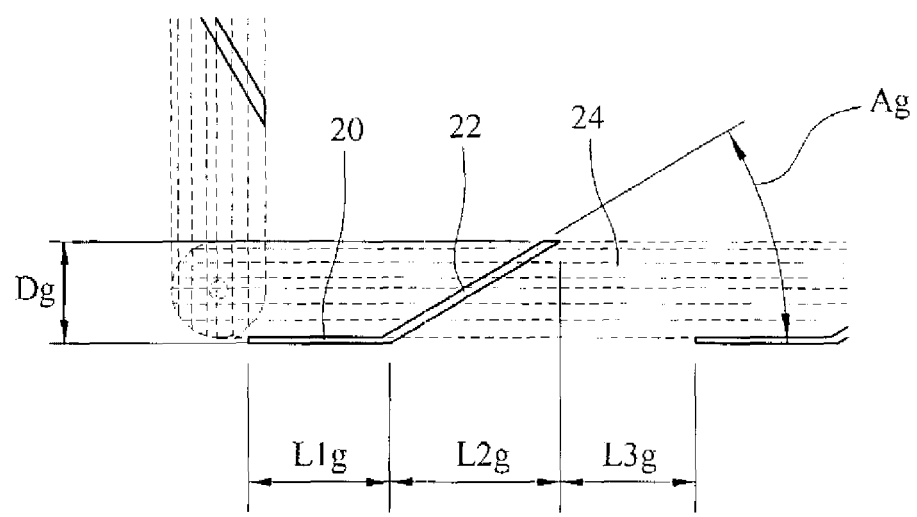
FIGS. 4 and 5 are views showing the specifications of the lattice guide structure of FIG. 2.
Figure 5:
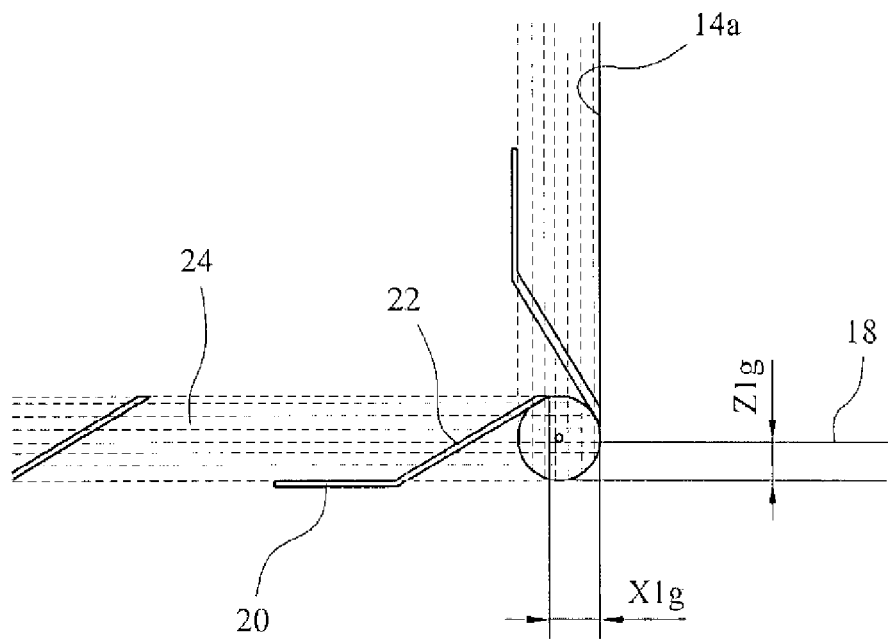

As shown in FIGS. 1, 4 and 5, reference character L denotes a bottom length of the moon pool 12, and reference character D denotes a depth of the moon pool 12. A length $L1g$ of each horizontal guide plate 20 ranges from 2% to 8% of the entire length of the moon pool 12. It is preferable that the length $L1g$ be about 4% of the entire length of the moon pool 12. A horizontal length $L2g$ of the guide ramp 22, as viewed from the bottom surface 18 on which the guide ramp 22 is vertically projected, ranges from 100% to 120% of the length $L1g$ of the horizontal guide plate 20. Preferably, the length $L2g$ is about 110% of the length $L1g$.

Furthermore, a horizontal distance $L3g$ between the front end of the guide ramp 22 and the rear end of the adjacent horizontal guide plate 20 ranges from 100% to 200% of the length $L1g$ of the horizontal guide plate 20. Preferably, the length $L3g$ is about 100% of the length $L1g$. For example, in the case of a ship which mainly runs on a pack ice area, such as the polar region, the length $L3g$ between the front end of the guide ramp 22 and the rear end of the adjacent horizontal guide plate 20 ranges from 500 mm to 2000 mm. Preferably, the length $L3g$ is set as 1000 mm to more effectively prevent pack ice from entering the moon pool 12 when the ship runs an a pack ice area.

The entire area of the horizontal guide plates 20 in the moon pool 12 is set such that it is about 30% or less of the entire horizontal area of the moon pool 12. Furthermore, an internal angle $Ag$ of the guide ramp 22 relative to the bottom surface 18 ranges from 20° to 45°. More preferably, the internal angle $Ag$ is 30°. The entire width of the horizontal guide plates 20 and the guide ramps 22 ranges from 90% to 100% of the width of the moon pool 12 and, more preferably, it is set as about 100% of the width of the moon pool 12. In addition, a height $Dg$ of the guide ramp 22, as viewed from the inner sidewall 14 on which the guide ramp 22 is horizontally projected, is set as a functional value determined depending on the length of the guide ramp 22 and the angle of the guide ramp 22 relative to the bottom surface 18.

Meanwhile, a distance $X1g$ between the bow-side inner sidewall of the moon pool 12 and the front end of the front-most guide ramp 22 ranges from 25% to 200% of the length of the horizontal guide plate 20, and preferably, it is set as 50% of the length of the horizontal guide plate 20. An installation position $Z1g$ of the horizontal guide plate 20 based on the bottom surface 18 ranges from −50% to 200% of the height $Dg$ of the guide ramp 22 and, preferably, it is 0% of the height $Dg$ of the guide ramp 22. In other words, it is most preferable that the horizontal guide plate 20 be level with the bottom surface 18. In this case, a separate stopper is provided on the hinge axis H to prevent the horizontal guide plates 20 from moving to a position below the bottom surface 18 when the lattice guide structure 16 rotates to the transit position. In other words, the stopper functions to support the lattice guide structure 16 such that the lattice guide structure 16 is prevented from moving to a position below the bottom surface 18.

Figure 6:
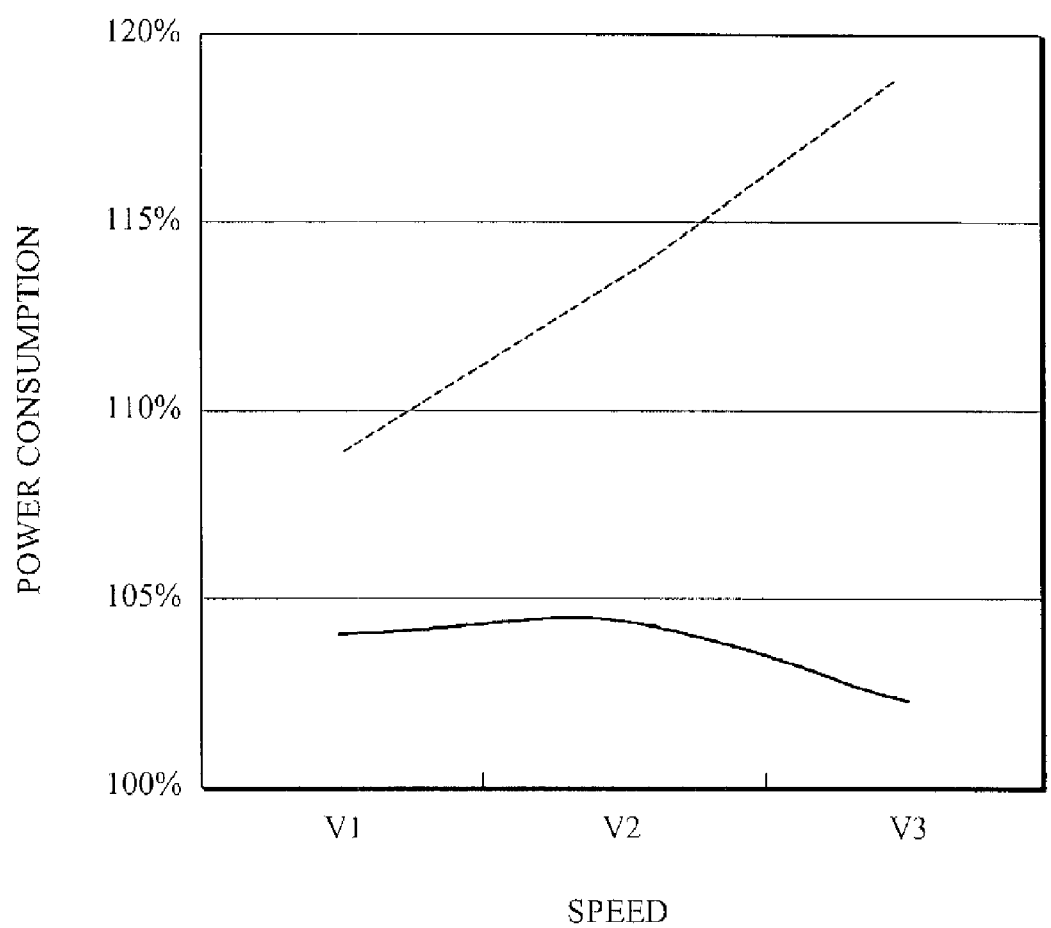
FIG. 6 is a graph showing the result of a test for flow resistance diminishing effect of a hull when the ship runs.

When the lattice guide structure 16 having the above-mentioned specifications is installed in the moon pool 12, the effect of diminishing resistance to the hull can be provided. This can be clearly understood from the graph of FIG. 6 showing the results of a model test. As shown in FIG. 6, compared to the case (shown by the dotted line) of the moon pool 12 having no lattice guide structure, when the lattice guide structure 16 is installed in the moon pool 12 and extended to the transit position (shown by the solid line), power consumption as a function of the speed of the hull is reduced by a maximum of about 15%. In more detail, the device of the present invention restricts movement of fluid in the moon pool 12 when the ship provided with the moon pool 12 runs, thus markedly diminishing resistance to the hull attributable to the movement of fluid in the moon pool 12. Thereby, compared to the case where the moon pool is open, the present invention can reduce a maximum of about 80% of an increment of power consumption when the ship runs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

A device for diminishing flow resistance in a moon pool according to the present invention has a lattice structure which selectively and partially closes the bottom area of the opening of the moon pool. Thus, when the ship equipped with the device runs, the device conducts a function of blocking separated flow from entering the moon pool, thus effectively reducing flow resistance to the ship. Furthermore, because the device is light, the use of the ship or marine structure equipped with the moon pool or the handling of the ship or marine structure can be facilitated. In particular, the device of the present invention can prevent pack ice flowing along the bottom surface of the ship from entering the moon pool when the ship runs on a pack ice area, such as the polar region.

Moreover, the lattice structure can be retracted in such a way as to rotate towards an inner sidewall of the moon pool. Thus, when investigation and drilling work is conducted through the moon pool, the moon pool can be open. Therefore, when equipment such as pipes is moved to the bottom of the sea through the moon pool, collision of the equipment to the hull of the ship can be more reliably avoided.

The invention claimed is:

1. A device for diminishing flow resistance in a moon pool, the device comprising a guide structure having a lattice shape, the guide structure comprising:
    a plurality of horizontal guide plates spaced apart from each other along a longitudinal direction of a hull, the horizontal guide plates being arranged in a plurality of rows along a lateral direction of the hull;
    a plurality of guide ramps arranged in a plurality of rows along the lateral direction of the hull, the guide ramps being coupled at rear ends thereof to front ends of the respective horizontal guide plates, wherein front ends of the guide ramps are inclined upwards towards a bow side of the hull and spaced apart from rear ends of the adjacent fore horizontal guide plates;
    a plurality of longitudinal reinforcing beams arranged in a plurality of rows along the longitudinal direction of the hull, the longitudinal reinforcing beams being coupled to the corresponding horizontal guide plates and the corresponding guide ramps; and
    a hinge axis around which the lattice guide structure is rotated in the moon pool towards a transit position or a working position.

2. The device according to claim 1, wherein further comprising:
    a frame provided in the moon pool so as to be rotatable around the hinge axis, the frame receiving and supporting therein the horizontal guide plates, the guide ramps and the longitudinal reinforcing beams such that the horizontal guide plates, the guide ramps and the longitudinal reinforcing beams are coupled to each other to have a lattice structure.

3. The device according to claim 1, wherein the hinge axis is set to at least one position in the moon pool.

4. The device according to claim 3, wherein the hinge axis is oriented in the lateral direction of the hull in the moon pool, whereby the guide structure is rotated around the hinge axis with respect to a bow-side inner sidewall or a stern-side inner sidewall so that the lattice guide structure is extended to the transit position or retracted to the working position.

5. The device according to claim 4, wherein the hinge axis comprises two hinge axes which are respectively disposed adjacent to the bow-side inner sidewall and the stern-side inner sidewall of the moon pool, and the lattice guide structure is divided into two parts based on an intermediate portion of the moon pool with respect to the longitudinal direction of the hull.

6. The device according to claim 3, wherein the hinge axis is oriented in the longitudinal direction of the hull in the moon pool, whereby the guide structure is rotated around the hinge axis with respect to a port-side inner sidewall or a starboard-side inner sidewall so that the lattice guide structure is extended to the transit position or retracted to the working position.

7. The device according to claim 6, wherein the hinge axis comprises two hinge axes which are respectively disposed adjacent to the port-side inner sidewall and the starboard-side inner sidewall of the moon pool, and the lattice guide structure is divided into two parts based on an intermediate portion of the moon pool with respect to the lateral direction of the hull.

8. The device according to claim 1, wherein an entire area of the horizontal guide plates in the moon pool is 30% or less of an entire horizontal area of the moon pool.

9. The device according to claim 8, wherein
    a length of each of the horizontal guide plates with respect to the longitudinal direction of the hull ranges from 2% to 8% of the entire length of the moon pool,
    a horizontal length of each of the guide ramps, as viewed from a bottom surface on which the guide ramp is vertically projected, ranges from 100% to 120% of the length of the horizontal guide plate,
    a horizontal distance between the front end of the guide ramp and the rear end of the adjacent fore horizontal guide plate ranges from 100% to 200% of the length of the horizontal guide plate,
    an internal angle of the guide ramp relative to the bottom surface ranges from 20% to 45%, an entire width of the horizontal guide plates and the guide ramps ranges from 90% to 100% of a width of the moon pool, a distance between the bow-side inner sidewall of the moon pool and a front end of a frontmost guide ramp ranges from 25% to 200% of the length of the horizontal guide plate, and the horizontal guide plate is level with the bottom surface of the hull.

10. The device according to claim 9, further comprising:

an operating unit rotating the lattice guide structure around the hinge axis in the moon pool to the transit position or the working position; and a locking unit retaining the lattice guide structure at the working position in the moon pool.

* * * * *